United States Patent [19]

Mentink

[11] Patent Number: 5,666,809
[45] Date of Patent: Sep. 16, 1997

[54] HYDRAULIC CIRCUIT

[75] Inventor: Laurentius A.G. Mentink, Haaksbergen, Netherlands

[73] Assignee: Applied Power Inc., Butler, Wis.

[21] Appl. No.: 501,917

[22] Filed: Jul. 13, 1995

[30] Foreign Application Priority Data

Jul. 20, 1994 [NL] Netherlands .............. 9401190

[51] Int. Cl.⁶ .................. F16D 31/02; B25B 5/14
[52] U.S. Cl. .................. 60/484; 91/494; 269/117
[58] Field of Search .................. 91/444, 445, 47, 91/51; 60/413, 477, 478, 484; 269/107, 117

[56] References Cited

U.S. PATENT DOCUMENTS

| | | |
|---|---|---|
| 2,586,682 | 2/1952 | McLeod . |
| 2,657,533 | 11/1953 | Schanzlin et al. .............. 60/478 X |
| 3,851,566 | 12/1974 | Herrmann .............. 91/411 |
| 5,067,768 | 11/1991 | Fischbach .............. 296/117 X |
| 5,110,175 | 5/1992 | Fischbach .............. 296/117 |
| 5,253,575 | 10/1993 | Claar et al. .............. 296/117 X |
| 5,279,119 | 1/1994 | Shelhart et al. .............. 60/401 |
| 5,335,926 | 8/1994 | Stolle .............. 280/117 |

FOREIGN PATENT DOCUMENTS

| | | |
|---|---|---|
| 425 156 A3 | 5/1991 | European Pat. Off. . |
| 565 190 A1 | 10/1993 | European Pat. Off. . |
| 1564040 | 3/1969 | France . |
| 2214054 | 12/1972 | France . |
| 483570 | 2/1970 | Germany . |
| 2 035 779 | 1/1972 | Germany . |
| 38 26 788 | 2/1990 | Germany . |
| 38 26 789 | 2/1990 | Germany . |
| 9300474 | 3/1993 | Netherlands . |
| 9300624 | 4/1993 | Netherlands . |
| 2 266 930 | 11/1993 | United Kingdom . |

*Primary Examiner*—Hoang Nguyen
*Attorney, Agent, or Firm*—Quarles & Brady

[57] ABSTRACT

A hydraulic circuit for opening and closing of a folding roof has at least two (pairs of) cylinders, one of which is adapted to open and close the folding roof and the other of which is adapted to lock the roof upon closing. The hydraulic circuit also has electrically operated valves provided in the circuit in such a way that the closing pressure within the roof cylinder is released rapidly as soon as the front roof edge gets within the catching area of the lock member, after which the lock cylinder will immediately close. This prevents the roof from moving in the closing direction too far, which would involve the tendency of the roof to "spring back", and avoids the chance of "miscatching" by the lock member.

2 Claims, 1 Drawing Sheet

HYDRAULIC CIRCUIT

BACKGROUND OF THE INVENTION

1. Field of the Invention

The invention relates to a hydraulic circuit, comprising at least two double acting piston cylinder devices, and more particularly to such a circuit for opening and closing a folding roof of a vehicle of the cabriolet type.

2. Discussion of the Prior Art

Hydraulic circuits of the aforementioned type typically have a reservoir for hydraulic fluid, an electric motor driven hydraulic pump connected therewith and, for each of the piston cylinder devices, an electrically operated valve that is connected to the space under the piston of the respective piston cylinder device so as to selectively connect the space either to the pump or to the reservoir.

In the above description the term "cylinder space under the piston" should be interpreted as the cylinder space at the end turned away from the piston rod, whereas "cylinder space above the piston" should be interpreted as the cylinder space at the piston rod end of the cylinder.

Such a circuit is well-known for hydraulically opening and closing folding roofs with vehicles of the cabriolet type. As an example, reference may be made to U.S. Pat. No. 5,454,292, issued Oct. 3, 1995. Three (pairs of) piston cylinder devices are used therein, which have to be activated in a certain sequence. In such a case, one speaks of a hydraulic circuit with a number of cylinder functions (three in the case referred to).

With this well-known circuit, the activation is effected by an irreversible pump in cooperation with a control valve block that comprises two valves for each (double acting) cylinder function. Such valves are relatively expensive and render a hydraulic device for opening and closing of a folding roof with a vehicle of the cabriolet type rather expensive, dependent on the number of cylinder functions to be activated.

The invention aims at meeting this drawback of the well-known circuit.

SUMMARY OF THE INVENTION

According to the invention this aim is achieved in that the pump is of the type with which a reversal of the direction of rotation will effect a change of the pressure and suction sides. The suction/pressure connections of the pump are, on one hand, connected to the reservoir via a suction shuttle valve and, on the other hand, connected to the first and second piston cylinder devices respectively via the electrically operated valves associated with the piston cylinder devices and via check valves positioned on the pump side of the electrically operated valves. The space above the piston of each of the piston cylinder devices is connected to the same suction/pressure conduit of the pump, i.e. with one piston cylinder device at a location on the pump side of the respective check valve, and with the other piston cylinder device at a location between the respective check valve and the associated electrically operated valve.

Due to the measures according to the present invention the activation of, e.g., two cylinder functions, e.g., one for the opening and closing of the roof and the second for the locking and unlocking of the roof, can be effected by only one control valve per piston cylinder device. The additional valves, such as the suction shuttle valve and the check valves, are cheap components.

It is to be noted that the use of reversible hydraulic pumps is known per se in hydraulic circuits, which are designed for one single cylinder function. As an example reference may be made to the European patent application 0248505. This application, however, does not teach how to design the circuit for activating more than one cylinder function.

The invention will be hereinafter further explained by way of example, with reference to the drawings.

DETAILED DESCRIPTION OF THE PREFERRED EMBODIMENT

Figure 1:
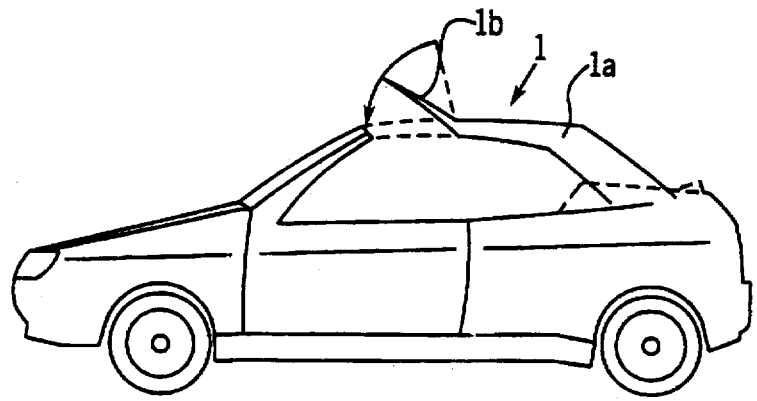
FIG. 1 is a diagrammatic view of a vehicle having a folding roof, wherein the roof is in the end phase of a closing procedure.

The folding roof as shown in FIG. 1 is in a partially closed position and comprises a rear folding section 1a and a front roof section 1b, said sections being pivotally connected to one another and are—in the example shown—operated by one single pair of piston cylinder devices (=one single cylinder function). In the situation shown in FIG. 1, the rear folding section 1a has already been stretched in the closing direction and only the front roof section 1b still has to be closed by means of a downward swinging movement. The front edge of the roof section 1b is thereby moving along the curved trajectory shown in FIG. 2. Before describing this curved trajectory, the hydraulic diagram of FIG. 3 will be explained first.

In this diagram, A and A1 designate the two piston cylinder devices, which are jointly moving—each positioned on a side—the folding roof 1a, 1b from the opened, folded position into the closed position and vice versa.

B is a piston cylinder device for operating a lock (not shown in the drawing) by means of which the roof may be locked in the closed position.

In the diagram, 2 designates a hydraulic pump which is adapted to be driven in opposite directions by a motor M, the suction/pressure sides of which pump are connected to conduits 3 and 4, the latter acting alternatingly as suction and pressure conduits respectively depending on the direction of rotation of the motor M, and said conduits being both connected to a reservoir 5 for hydraulic fluid. A suction shuttle valve 6 is placed in parallel to the pump 2.

The conduit 3 is connected to the space under the piston of both of the piston cylinder devices A and A' via a first solenoid valve 11 of the 3/2 type and via a first check valve 11a that is positioned on the pump side of the solenoid valve 11.

The conduit 4 is connected to the space under the piston of the second piston cylinder device B via a second solenoid valve 12 and a second check valve 12a positioned on the pump side of the solenoid valve 12.

At a location p on the pump side of the first check valve 11a, a connecting conduit 13 is branched off from the conduit 3 toward the space above the piston of the two piston cylinder devices A and A'.

At a location q between the valve 12 and the valve 12a a connecting conduit 14 is branched off from the conduit 4 toward the space above the piston of the piston cylinder device B.

Furthermore the conduits 3 and 4 are interconnected at a location between the valves 11 and 11a on one hand and the valves 12 and 12a on the other hand, by means of a conduit 15, in which a (normally closed) overload valve 7 and a normally closed but manually openable auxiliary valve 8 are provided.

Figure 3:
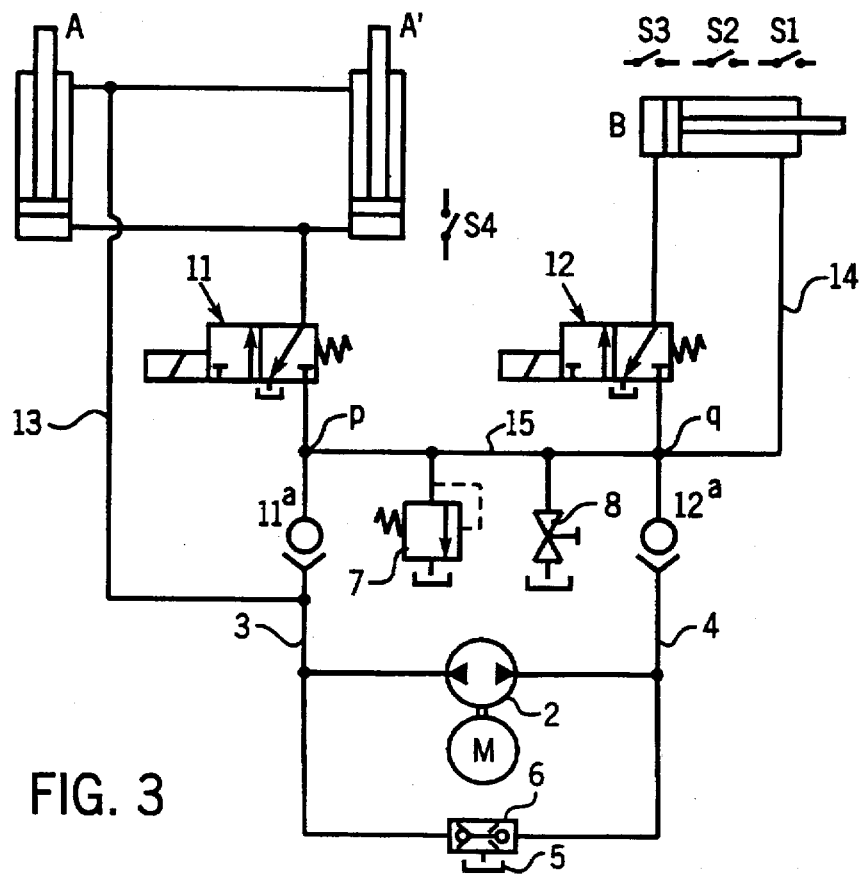
FIG. 3 shows an example of the hydraulic circuit according to the present invention.

In the diagram of FIG. 3, both of the 3/2-valves 11 and 12 are in the de-energized, inoperative stage (which means that the space under the piston of the cylinders A, A' and B respectively are connected to the reservoir 5).

S1-S4 designate switches, the function of which will appear hereinafter when describing the operation of the hydraulic system.

Before starting the description of the operation of the circuit described hereinabove, it is assumed that the folding roof is completely closed and locked. This means that the two main cylinders A, A1 are in the extended positions, while the auxiliary cylinder B, which locks the roof in the closed position by means of a lock at the front fixed roof edge, takes a completely retracted position. Both of the valves 11 and 12 are de-energized.

By depressing a switch "open roof" (not shown) the motor of the pump 2 is activated in a direction (to the right as seen in the diagram) which causes the left hand conduit 3 to function as a suction conduit and causes the right hand conduit 4 to function as a pressure conduit. Simultaneously the valve 12 is energized (while valve 11 is kept de-energized), so that hydraulic fluid is supplied via the suction shuttle valve 6 and the valve 12 to (both ends of) the cylinder B, which causes the latter to (regeneratively) extend so as to move the lock into its inoperative position.

Approaching the inoperative position (with the cylinder B being extended) causes the switch S2 to close and thereby reverse the direction of rotation of the pump. Hydraulic fluid is now supplied to the piston rod side of the cylinders A and A' to cause the latter to retract. The valve 12 is kept energized.

As soon as the cylinders A-A' are completely retracted and the roof is thereby completely opened, closing of limit switch S4 causes the valve 12 to be de-energized and thereby connected to the reservoir again. De-energization of the valve 12 results in that only the piston rod side of the cylinder B is still under pressure, so that this cylinder B will retract and move the respective lock into its closed (and hidden) position. Switch S3 closes and causes the pump motor to stop.

Starting from the latter situation (i.e. roof completely open), depression of the button "close roof" will put the pump motor into operation and cause the pump to rotate clockwise, while valve 12 is energized again. Conduit 3 now functions as a suction conduit and conduit 4 as a pressure conduit. Cylinder B extends until switch S2 is operated, after which valve 11 is energized to cause the cylinders A-A' to extend. At the time the switch S1 adjacent the front fixed roof edge is operated (by the moving front roof edge) the valves 11 and 12 are de-energized and thereby placed in the "fluid return position". This causes the lock cylinder B to retract without delay, while on the other hand the forward roof section is released from pressure, so that it will not move unduly far into the forward direction.

Figure 2:
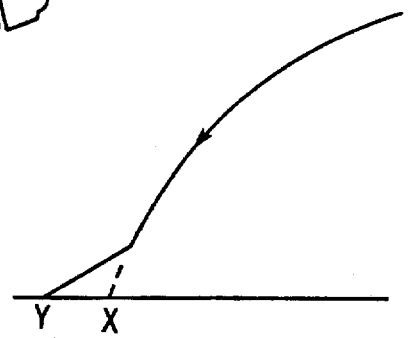
FIG. 2 shows a curved trajectory which is followed by the front edge of the folding roof in the final phase of the closing movement.

In the curved trajectory of FIG. 2, Y indicates the end position of a roof, which has been moved forward too far under the influence of an unduly large closing force. The path according to the desired curved trajectory with the end position X is promoted by means of the circuit according to the present invention by dropping the pressure on the main cylinders A-A' as soon as possible during the final phase of the closing and locking of the roof. Accordingly, as soon as the front roof section has arrived in the "catch region" of the lock:

a. the lock cylinder will close rapidly and b. the main cylinders A-A' will be released from pressure.

A release of pressure from the roof in the closing direction during locking may thus prevent the roof from continuing moving too far into the direction of location "Y". Locking of the roof by means of the lock may then occur rather smoothly. As a condition for a reliable operation, however, the locking mechanism has to react quickly to avoid "miscatching" as a result of the tendency of the roof to spring back under the influence of the tension in it.

In emergency cases, when manual operation is required, the auxiliary valve 8 may be manually opened to connect conduit 15 to the reservoir and thereby avoid any hydraulic blocking.

I claim:

1. A hydraulic circuit, comprising at least two double acting piston cylinder devices for opening and closing a folding roof of a cabriolet type vehicle, a reservoir for hydraulic fluid, an electric motor driven hydraulic pump connected with said reservoir, and an electrically operated valve for each of said piston cylinder devices, said valve being connected to the space under the piston of the respective piston cylinder device so as to selectively connect said space either to the pump or to the reservoir, characterized in that the pump is of the type with which a reversal of the direction of rotation will effect a change of the pressure and suction sides, the suction/pressure connections of said pump being, on one hand, connected to the reservoir via a suction shuttle valve and, on the other hand, connected to the first and second piston cylinder devices respectively via the electrically operated valves associated with said piston cylinder devices and via check valves positioned on the pump side of said electrically operated valves, the space above the piston of each of the piston cylinder devices being connected with the same suction/pressure conduit of the pump with one piston cylinder device being connected at a location on the pump side of the respective check valve, and with the other piston cylinder device being connected at a location between the respective check valve and the associated electrically operated valve.

2. A hydraulic circuit according to claim 1, characterized in that both of the suction/pressure conduits are connected at locations between the electrically operated valves and the associated check valves, and that in the connecting conduit there is provided a normally closed but manually openable valve.

* * * * *